United States Patent
Zhang et al.

(10) Patent No.: US 10,893,098 B2
(45) Date of Patent: Jan. 12, 2021

(54) METHOD AND APPARATUS FOR DATA WRITING

(71) Applicant: ALIBABA GROUP HOLDING LIMITED, Grand Cayman (KY)

(72) Inventors: Yingqiang Zhang, Hangzhou (CN); Dengcheng He, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/553,077

(22) Filed: Aug. 27, 2019

(65) Prior Publication Data
US 2020/0076890 A1    Mar. 5, 2020

(30) Foreign Application Priority Data
Aug. 29, 2018  (CN) .......................... 2018 1 0994734

(51) Int. Cl.
| | |
|---|---|
| *G06F 15/173* | (2006.01) |
| *H04L 29/08* | (2006.01) |
| *G06F 16/178* | (2019.01) |
| *G06F 16/182* | (2019.01) |

(52) U.S. Cl.
CPC ........ *H04L 67/1051* (2013.01); *G06F 16/178* (2019.01); *G06F 16/1844* (2019.01); *H04L 67/1095* (2013.01)

(58) Field of Classification Search
CPC ............. H04L 67/1051; H04L 67/1095; G06F 16/178; G06F 16/1844

USPC ........................................................ 709/223
See application file for complete search history.

(56) References Cited

U.S. PATENT DOCUMENTS

| | | | |
|---|---|---|---|
| 2011/0178985 A1* | 7/2011 | San Martin Arribas | ..................... G06F 16/275 707/636 |
| 2013/0332484 A1* | 12/2013 | Gajic | ...................... G06F 16/20 707/770 |
| 2014/0164831 A1 | 6/2014 | Merriman et al. | |
| 2015/0046395 A1 | 2/2015 | Rath et al. | |
| 2016/0132581 A1* | 5/2016 | Hsieh | .................. G06F 16/2343 707/615 |
| 2016/0366220 A1 | 12/2016 | Gottlieb et al. | |
| 2017/0201590 A1* | 7/2017 | Wojciechowski | .. H04L 67/1097 |
| 2020/0019476 A1* | 1/2020 | Arevalo | .............. G06F 11/1453 |

OTHER PUBLICATIONS

PCT International Search Report dated Dec. 27, 2019, issued in corresponding International Application No. PCT/US2019/048317 (10 pgs.).

* cited by examiner

*Primary Examiner* — Frantz B Jean
(74) *Attorney, Agent, or Firm* — Finnegan, Henderson, Farabow, Garrett & Dunner LLP

(57) ABSTRACT

Embodiments of present disclosure provides a method and an apparatus for data writing. An exemplary method includes: obtaining first to-be-written data; determining a first group identifier corresponding to the first to-be-written data; determining a master node corresponding to the first group identifier; and writing the first to-be-written data if the master node is the current node.

17 Claims, 5 Drawing Sheets

METHOD AND APPARATUS FOR DATA WRITING

CROSS REFERENCE TO RELATED APPLICATION

The disclosure claims the benefits of priority to Chinese application number 201810994734.4, filed Aug. 29, 2018, which is incorporated herein by reference in its entirety.

TECHNICAL FIELD

The present disclosure relates to the technical field of the database, and in particular, to a method and an apparatus for data writing.

BACKGROUND

Distributed consensus protocols (such as Paxos) are the core components of distributed databases. The distributed consensus protocols are used to ensure the consistency of multi-copy data, disaster-tolerance switching and other capabilities of a distributed database, and their performance affects the performance of the entire distributed database. Currently, distributed consensus protocols only support single-point writing and do not support multi-point writing. For example, a distributed database includes node A located in region A and node B located in region B. A master node of Paxos group 1 is node A, and a slave node of the Paxos group 1 is node B. When user 1 is located in the region A, the user 1 may be added to the Paxos group 1. When the user 1 requests to write data X in the region A, the data X is sent to the node A. Since the node A is the master node of the Paxos group 1, the data X may be written locally and synchronized to the node B. When the user 1 moves to the region B and requests to write data Y, the data Y is sent to the node B. Since the node B is a slave node of the Paxos group 1, the data Y cannot be written locally, resulting in a writing failure of the data Y.

With rapid development of distributed database technologies, distributed databases internationally deployed across regions have become popular, resulting in a common need for multi-point writing of data. Since the distributed consensus protocols do not support multi-point writing of data, it is impossible for users moving cross regions to write data into nodes in the current region based on the distributed consensus protocols, thereby leading to poor user experience of the service.

SUMMARY

Embodiments of present application provides a method and an apparatus for data writing. In some embodiments, an exemplary method for data writing implemented by a node of a distributed database system includes obtaining first to-be-written data; determining a first group identifier corresponding to the first to-be-written data; determining a master node corresponding to the first group identifier; and writing the first to-be-written data if the master node is the node.

In some embodiments, an exemplary method for data writing, implemented by a first node of a distributed database system, includes: receiving a message from a second node of the distributed database system, the message comprising a second group identifier; determining a data row in a data table corresponding to the second group identifier; modifying a first group identifier in the data row to the second group identifier, the first group identifier indicating that the first node is a master node capable of modifying the first data row; and sending an update message to the second node.

In some embodiments, an exemplary apparatus for data writing at a node of a distributed database system includes: a memory storing a set of instructions; and one or more processors configured to execute the set of instructions to cause the apparatus to perform any of methods of embodiments of present disclosure.

In some embodiments, a non-transitory machine-readable storage medium is provided. The non-transitory machine-readable storage medium has instructions stored thereon. When executed by a processor, the instructions cause a machine to perform any of methods of embodiments of present disclosure.

BRIEF DESCRIPTION OF THE DRAWINGS

In order to more clearly illustrate the technical solutions in the embodiments of the present disclosure, the drawings to be used in the description of the embodiments of the present disclosure will be briefly described below. Apparently, the drawings in the following description only illustrate some of the embodiments described in the present disclosure.

DETAILED DESCRIPTION

The terminology used in the present disclosure is only for the purpose of describing specific embodiments, rather than limiting the present disclosure. The singular forms "a," "said" and "the" as used in the present disclosure and the appended claims are also intended to include plural forms unless otherwise explicitly indicated in the context. It should also be understood that the term "and/or" as used herein refers to any or all possible combinations including one or more listed associated items.

It should be understood that although the terms "first," "second," "third," etc. may be used in the embodiments of the present disclosure to describe various types of information, such information should not be limited to these terms. These terms are only used to distinguish pieces of information of the same type from each other. For example, first information may also be referred to as second information without departing from the scope of the present disclosure. Similarly, the second information may also be referred to as the first information. It depends on the context. In addition, the word "if" as used herein may be interpreted as "at the time of or when" or "in response to a determination."

Some embodiments of the present disclosure provide a method for data writing, which may be applied to any node (referred to as the current node) in a distributed database.

Figure 1:
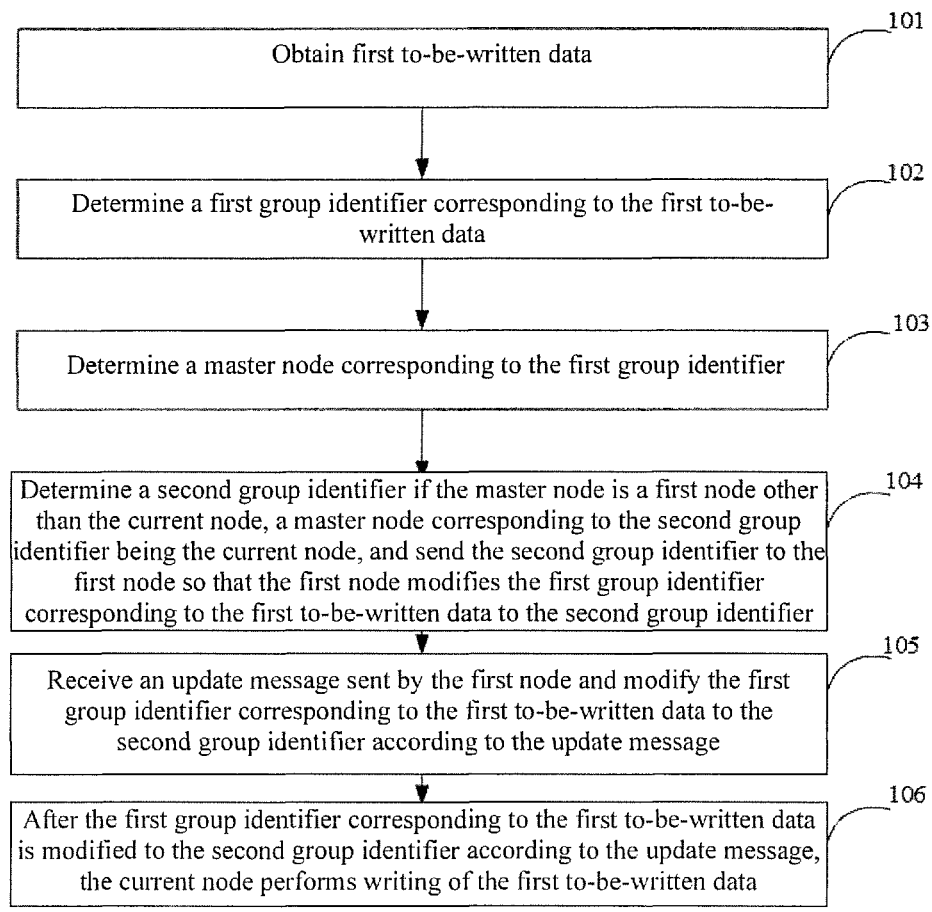
FIG. 1 is a flowchart of a method for data writing according to some embodiments of the present disclosure.

Referring to FIG. 1, which is an exemplary flowchart of the method, the method can include the following steps.

In step 101, first to-be-written data is obtained.

In step 102, a first group identifier corresponding to the first to-be-written data is determined. Determining a first group identifier corresponding to the first to-be-written data can include, but is not limited to, determining a first data table corresponding to the first to-be-written data, and a first data row in the first data table corresponding to the first to-be-written data. The first data row can include a group identifier corresponding to the first to-be-written data. Further, the group identifier in the first data row can be determined as a first group identifier.

In Step 103, a master node corresponding to the first group identifier is determined. Determination of a master node corresponding to the first group identifier can include, but is not limited to, retrieving the master node from a mapping table. For example, the mapping table can be searched with the first group identifier to obtain a master node corresponding to the first group identifier.

In an example, a mapping table can include a plurality of group identifiers and corresponding master nodes. Thus, the mapping table can record the correspondence between the group identifier and the master node. Based on this, after obtaining the first group identifier corresponding to the first to-be-written data, the mapping table can be searched with the first group identifier for a master node corresponding to the first group identifier.

In Step 104, a second group identifier is determined if the master node is a first node other than the current node. The current node is a master node corresponding to the second group identifier. The second group identifier is sent to the first node. The first node can receive the second group identifier and modify the first group identifier corresponding to the second group identifier or the first to-be-written data to the second group identifier. In some embodiments, the first group identifier is included in a data row of a data table. Then, the first node can send an update message to the current node. The update message can indicate that at the first node, the first group identifier is modified to the second group identifier.

Determining a second group identifier can include, but is not limited to, obtaining a group identifier in the mapping table, and if a master node corresponding to the group identifier is the current node, determining the group identifier as a second group identifier.

In an example, a mapping table can include a plurality of group identifiers and corresponding master nodes. Thus, the mapping table can record the correspondence between the group identifier and the master node. Based on this, for each group identifier recorded in the mapping table, if a master node corresponding to the group identifier is the current node, the group identifier can be determined as a second group identifier.

Sending the second group identifier to the first node can include, but is not limited to, sending a notification message to the first node. The notification message can include the second group identifier. The notification message can also include index information of the first to-be-written data.

The notification message here can enable the first node to determine a second data row corresponding to the first to-be-written data according to the index information and modify the first group identifier recorded in the second data row to the second group identifier.

In Step 105, an update message sent by the first node is received, and the first group identifier corresponding to the first to-be-written data is modified to the second group identifier according to the update message. Modification of the first group identifier corresponding to the first to-be-written data to the second group identifier according to the update message can include, but is not limited to, if the update message further includes the index information of the first to-be-written data, determining, according to the index information, the first data row in the first data table corresponding to the first to-be-written data, and then modifying the first group identifier in the first data row to the second group identifier.

In Step 106, the current node writes the first to-be-written data. In some embodiments, writing the first to-be-written data can be performed after the first group identifier corresponding to the first to-be-written data is modified to the second group identifier according to the update message.

In some embodiments, the current node and the first node can be located in different regions. The first to-be-written data can be sent after a user migrates from a region where the first node is located to a region where the current node is located.

In an example, the method for data writing further includes the following steps (not shown in FIG. 1).

In Step 107, second to-be-written data is obtained. The index information of the second data and the index information of the first to-be-written data can be the same or different. As an example, the case where the two are the same is described.

In Step 108, a group identifier corresponding to the second to-be-written data is determined. Determining a group identifier corresponding to the second to-be-written data can include, but is not limited to, determining a second data table corresponding to the second to-be-written data and a third data row corresponding to the second to-be-written data in the second data table. The third data row can include a group identifier corresponding to the second to-be-written data. Further, the group identifier in the third data row can be determined as a group identifier corresponding to the second to-be-written data.

In Step 109, if the group identifier corresponding to the second to-be-written data is different from the second group identifier, a master node corresponding to the group identifier which is corresponding to the second to-be-written data is determined. Determining a master node corresponding to the group identifier which is corresponding to the second to-be-written data can include, but is not limited to, retrieving this master node from a mapping table. For example, the mapping table can be searched with the group identifier corresponding to the second to-be-written data to obtain a master node corresponding to the group identifier which is corresponding to the second to-be-written data. In an example, a mapping table can include a plurality of group identifiers and corresponding master nodes. Thus, the mapping table can record the correspondence between the group identifier and the master node. Based on this, after obtaining the group identifier corresponding to the second to-be-written data, the mapping table can be searched with the group identifier corresponding to the second to-be-written data to obtain a master node corresponding to the group identifier which is corresponding to the second to-be-written data.

In Step 110, the second group identifier is sent to a third node if the master node is the third node other than the current node. The third node can receive the second group identifier and modify the group identifier corresponding to the second group identifier or the second to-be-written data to the second group identifier. In some embodiments, the group identifier corresponding to the second to-be-written data is included in a data row of a data table. Then, the third node can send an update message to the current node. The update message can indicate that at the third node, the group identifier corresponding to the second to-be-written data is modified to the second group identifier.

Sending the second group identifier to the third node can include, but is not limited to, sending a notification message to the third node. The notification message can include the second group identifier. The notification message can also include index information of the second to-be-written data.

The notification message here can enable the third node to determine a data row corresponding to the second to-be-written data according to the index information and modify a group identifier in the data row to the second group identifier.

In Step 111, an update message sent by the third node is received, and the group identifier corresponding to the second to-be-written data is modified to the second group identifier according to the update message. Modification of the group identifier corresponding to the second to-be-written data to the second group identifier according to the update message can include, but is not limited to, if the update message further includes the index information of the second to-be-written data, determining, according to the index information, a third data row corresponding to the second to-be-written data in a second data table, and then modifying a group identifier in the third data row to the second group identifier.

In Step 112, the current node writes the second to-be-written data. In some embodiments, writing the second to-be-written data can be performed after the group identifier corresponding to the second to-be-written data is modified to the second group identifier according to the update message, In an example, after the master node corresponding to the group identifier that is corresponding to the second to-be-written data is determined at Step 109, if the master node is the current node, the current node modifies the group identifier corresponding to the second to-be-written data to the second group identifier. The current node further writes the second to-be-written data.

Further, an update message can also be sent to other nodes than the current node. The update message can enable other nodes to modify the group identifier corresponding to the second to-be-written data to the second group identifier according to the update message.

In an example, after the group identifier corresponding to the second to-be-written data is determined at Step 108, if the group identifier corresponding to the second to-be-written data is the same as the second group identifier, the current node performs the writing of the second to-be-written data but does not perform the foregoing Steps 109-112.

In some embodiments, the group identifiers can include, but are not limited to, group identifiers of distributed consensus protocols.

It is appreciated that the sequences of the steps described above in present disclosure are only examples given for convenience of description, rather than limitations. In an actual application, the sequence of the steps can be changed. The steps of corresponding methods are not necessarily performed in the sequence shown and described herein, and the methods can include more or less steps than those described in the present disclosure. In addition, a single step described in the present specification can be decomposed into a plurality of steps in some embodiments. Various steps described in the present disclosure can be combined into a single step in some embodiments.

In some embodiments of the present disclosure, a distributed consensus protocol supporting multi-point writing is provided. Since the distributed consensus protocol supports multi-point writing of data, for users moving across regions, data can be written in nodes in the current region based on the distributed consensus protocol. Therefore, the user experience of the service can be improved. As a result, the distributed consensus protocol can support near-writing and dynamic migration for the user, and can realize the multi-point writing at the row level and the user level. Moreover, the data consistency of the distributed database can be ensured. Distributed transactions across regions can be implemented, the cross-region problem of data at the user latitude can be solved, and the near-writing of service can be supported.

Figure 2:
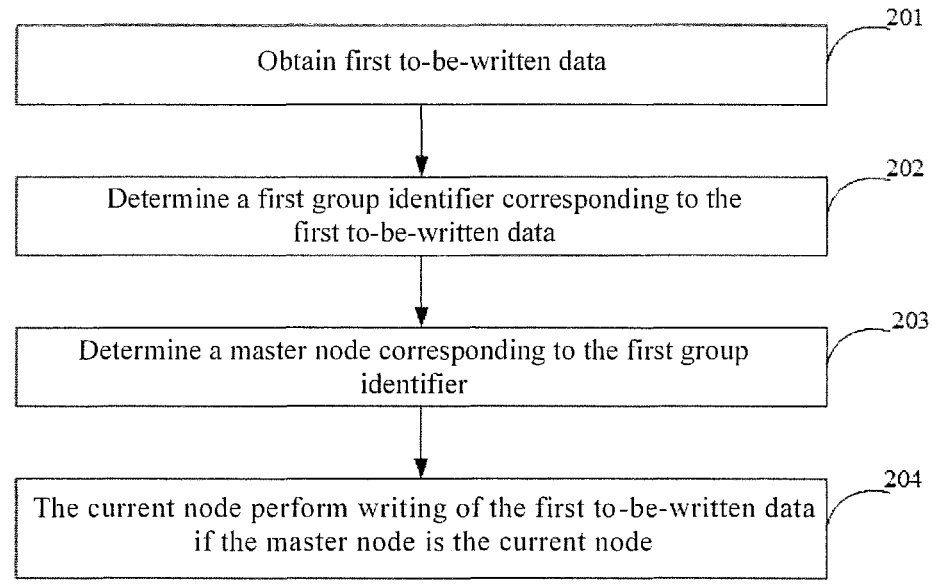
FIG. 2 is a flowchart of a method for data writing according to some embodiments of the present disclosure.

Some embodiments of the present disclosure provide a method for data writing, which can be applied to any node (referred to as the current node) in a distributed database. Referring to FIG. 2, which is an exemplary flowchart of the method, the method can include: in step 201, obtaining first to-be-written data; in step 202, determining a first group identifier corresponding to the first to-be-written data; and in step 203, determining a master node corresponding to the first group identifier. For the steps 201-203, reference can be made to the steps 101-103 and they will not be elaborated here. In Step 204, the current node writes the first to-be-written data if the master node is the current node.

In an example, the method for data writing further includes the following steps (not shown in FIG. 2).

In Step 205, second to-be-written data is obtained. The index information of the second data and the index information of the first to-be-written data can be the same or different. As an example, the case where the two are the same is described.

In Step 206, a group identifier corresponding to the second to-be-written data is determined. Determining a group identifier corresponding to the second to-be-written data can include, but is not limited to, determining a second data table corresponding to the second to-be-written data and a third data row corresponding to the second to-be-written data in the second data table. The third data row can include a group identifier corresponding to the second to-be-written data. Further, the group identifier in the third data row can be determined as a group identifier corresponding to the second to-be-written data.

In Step 207, if the group identifier corresponding to the second to-be-written data is different from the first group identifier, a master node corresponding to the group identifier which is corresponding to the second to-be-written data is determined. Determining a master node corresponding to the group identifier that is corresponding to the second to-be-written data can include, but is not limited to, retrieving this master ode from a mapping table. For example, the mapping table can be searched with the group identifier corresponding to the second to-be-written data to obtain a master node corresponding to the group identifier that is corresponding to the second to-be-written data. In an example, a mapping table can include a plurality of group identifiers and corresponding master nodes. Thus, the mapping table can record the correspondence between the group identifier and the master node. Based on this, after obtaining the group identifier corresponding to the second to-be-written data, the mapping table can be searched with the group identifier corresponding to the second to-be-written data to obtain a master node corresponding to the group identifier which is corresponding to the second to-be-written data.

In Step 208, if the master node is a second node other than the current node, the first group identifier is sent to the second node. The second node can receive the first group identifier and modify the group identifier corresponding to the first group identifier or the second to-be-written data to the first group identifier. In some embodiments, the group identifier corresponding to the second to-be-written data is included in a data row of a data table. Then, the second node can send an update message to the current node. The update message can indicate that at the second node, the group identifier corresponding to the second to-be-written data is modified to the first group identifier.

Sending the first group identifier to the second node can include, but is not limited to, sending a notification message to the second node. The notification message can include the first group identifier. The notification message can also include index information of the second to-be-written data.

The notification message here can enable the second node to determine a data row corresponding to the second to-be-written data according to the index information and modify a group identifier in the data row to the first group identifier.

In Step 209, an update message sent by the second node is received, and the group identifier corresponding to the second to-be-written data is modified to the first group identifier according to the update message. Modification of the group identifier corresponding to the second to-be-written data to the first group identifier according to the update message can include, but is not limited to, if the update message further includes the index information of the second to-be-written data, determining, according to the index information, a third data row corresponding to the second to-be-written data in a second data table, and then modifying a group identifier in the third data row to the first group identifier.

In Step 210, the current node writes the second to-be-written data. In some embodiments, writing the second to-be-written data can be performed after the group identifier corresponding to the second to-be-written data is modified to the first group identifier according to the update message, In an example, after the master node corresponding to the group identifier that is corresponding to the second to-be-written data is determined at Step 207, if the master node is the current node, the current node modifies the group identifier corresponding to the second to-be-written data to the first group identifier. The current node further writes the second to-be-written data.

Further, an update message can also be sent to other nodes than the current node. The update message can enable other nodes to modify the group identifier corresponding to the second to-be-written data to the first group identifier according to the update message.

In an example, after the group identifier corresponding to the second to-be-written data is determined at the Step 206, if the group identifier corresponding to the second to-be-written data is the same as the first group identifier, the current node performs the writing of the second to-be-written data but does not perform the foregoing Steps 207-210.

In some embodiments, the group identifiers can include, but are not limited to, group identifiers of distributed consensus protocols.

It is appreciated that the sequences of the steps described above in present disclosure are only examples given for convenience of description, rather than limitations. In an actual application, the sequence of the steps can also be changed. The steps of corresponding methods are not necessarily performed in the sequence shown and described herein, and the methods can include more or less steps than those described in the present disclosure. In addition, a single step described in the present disclosure can be decomposed into a plurality of steps in some embodiments. Various steps described in the present disclosure can be combined into a single step in some embodiments.

In some embodiments of the present disclosure, a distributed consensus protocol supporting multi-point writing is provided. Since the distributed consensus protocol supports multi-point writing of data, for users moving across regions, data can be written in nodes in the current region based on the distributed consensus protocol. Therefore, the user experience of the service can be improved. As a result, the distributed consensus protocol can support near-writing and dynamic migration for the user, and can realize the multi-point writing at the row level and the user level. Moreover, the data consistency of the distributed database can be ensured. Distributed transactions across regions can be implemented, the cross-region problem of data at the user latitude can be solved, and the near-writing of service can be supported.

Some embodiments of the present disclosure provide another method for data writing, which can be applied to any node (referred to as the current node) in a distributed database. The current node corresponds to at least one group, and serves as a master node of the group. The method can include the following steps: first to-be-written data is obtained and a first data row corresponding to the first to-be-written data is determined. The first data row can include a group identifier corresponding to the first to-be-written data.

The group identifier included in the first data row can be then modified to a group identifier of a group corresponding to the current node, to dynamically bind the first data row to the group corresponding to the current node.

Regarding determining a first data row corresponding to the first to-be-written data, reference can be made to the foregoing Step 102 and it will not be elaborated here. Regarding modifying the group identifier included in the first data row to a group identifier of a group corresponding to the current node, reference can be made to the foregoing Steps 103-106 and it will not be elaborated here.

In some embodiments of the present disclosure, by dynamically binding the first data row to the group corresponding to the current node, multi-point writing of data is supported. For users moving across regions, data can be written in nodes in the current region based on the distributed consensus protocol. The user experience of the service can be improved. The distributed consensus protocol supports the near-writing and dynamic migration for the user, and the multi-point writing at the row level and the user level can be realized. Moreover, the data consistency of the distributed database can be ensured, and distributed transactions across regions can be realized.

Figure 3A:
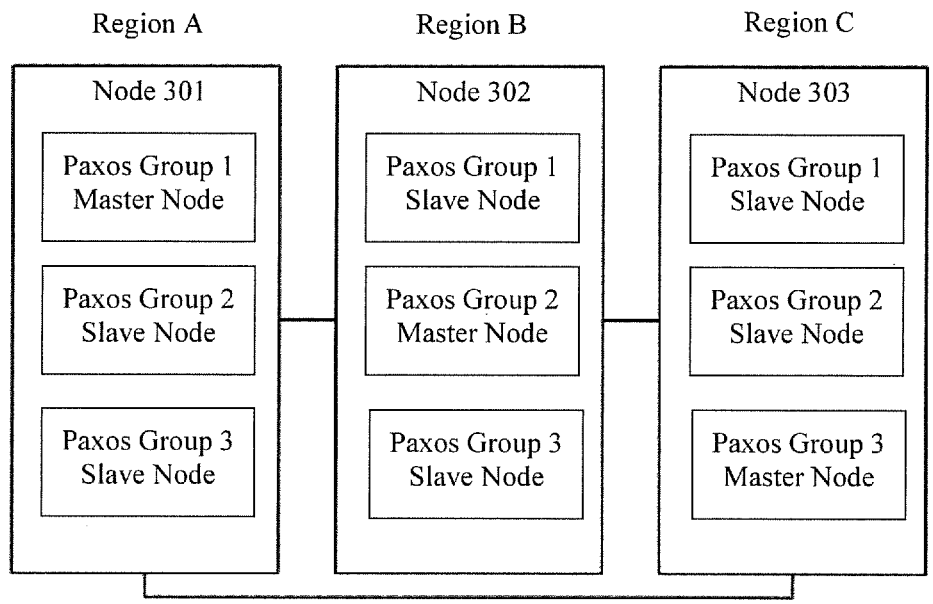
FIG. 3A is a schematic diagram of an application scenario according to some embodiments of the present disclosure.

The following describes methods for data writing in combination with a specific application scenario. Referring to FIG. 3A, a schematic diagram of an application scenario of the present embodiment is shown, where a distributed database including three nodes is illustrated as an example. In practical applications, the distributed database can include more nodes, and the number of nodes is not limited here.

As shown in FIG. 3A, Node 301 can be deployed in Region A (e.g., Hangzhou, etc.), Node 302 can be deployed in Region B (e.g., Shanghai, etc.), and Node 303 can be deployed in Region C (e.g., Beijing, etc.).

In this embodiment, the distributed database can use a distributed consensus protocol (such as Paxos, etc.) to ensure the consistency of multi-copy data, disaster-tolerance switching and other capabilities. In order to enable the distributed consensus protocol to support multi-point writing, multiple groups (such as distributed consensus protocol groups) can be set, and each group has a unique group identifier (such as the group identifier of the distributed consensus protocol). For convenience of description, for example, in the case where the distributed consensus protocol is Paxos, multiple Paxos groups can be set, and each Paxos group has a unique Paxos group identifier.

In an example, the number of Paxos groups can be related to the number of nodes. For example, the number of Paxos groups is a positive integer multiple of the number of nodes. If the number of nodes is 3, the number of Paxos groups can be 3, 6, 9, and so on. The number of Paxos groups can also be independent of the number of nodes. For example, the number of Paxos groups can be any value, such as 3, 4, 5, 6, 7, and so on. The number of Paxos groups is not limited here, and the case of six Paxos groups is taken as an example in the following description.

The group identifier of Paxos Group 1 can be AA, the group identifier of Paxos Group 2 can be BB, the group identifier of Paxos Group 3 can be CC, the group identifier of Paxos Group 4 can be DD, the group identifier of Paxos Group 5 can be EE, and the group identifier of Paxos Group 6 can be FF. Moreover, each node can store the mapping table shown in Table 1, which is used to record the correspondence among the group identifiers, master nodes and slave nodes.

TABLE 1

| Group identifier | Master node | Slave node |
| --- | --- | --- |
| AA | Node 301 | Nodes 302 and 303 |
| BB | Node 302 | Nodes 301 and 303 |
| CC | Node 303 | Nodes 301 and 302 |
| DD | Node 301 | Nodes 302 and 303 |
| EE | Node 302 | Nodes 301 and 303 |
| FF | Node 303 | Nodes 301 and 302 |

The mapping table shown in Table 1 can be configured according to experience. For each Paxos group, the Paxos group corresponds to one master node (also referred to as a LEADER node), and the remaining nodes are slave nodes (also referred to as FOLLOWER nodes). In some embodiments, as can be seen from Table 1, for all Paxos groups, each node has the same number of times to be a master node, and each node has the same number of times to be a slave node.

For convenience of description, only Paxos Group 1, Paxos Group 2, and Paxos Group 3 are shown in FIG. 3A, and Paxos Group 4, Paxos Group 5, and Paxos Group 6 are similar to Paxos Group 1, Paxos Group 2, and Paxos Group 3. As can be seen from FIG. 3A, Node 301 is the master node of Paxos Group 1 and also is the slave node of Paxos Group 2 and Paxos Group 3. Node 302 is the master node of Paxos Group 2 and also is the slave node of Paxos Group 1 and Paxos Group 3. Node 303 is the master node of Paxos Group 3 and also is the slave node of Paxos Group 1 and Paxos Group 2.

Figure 3B:
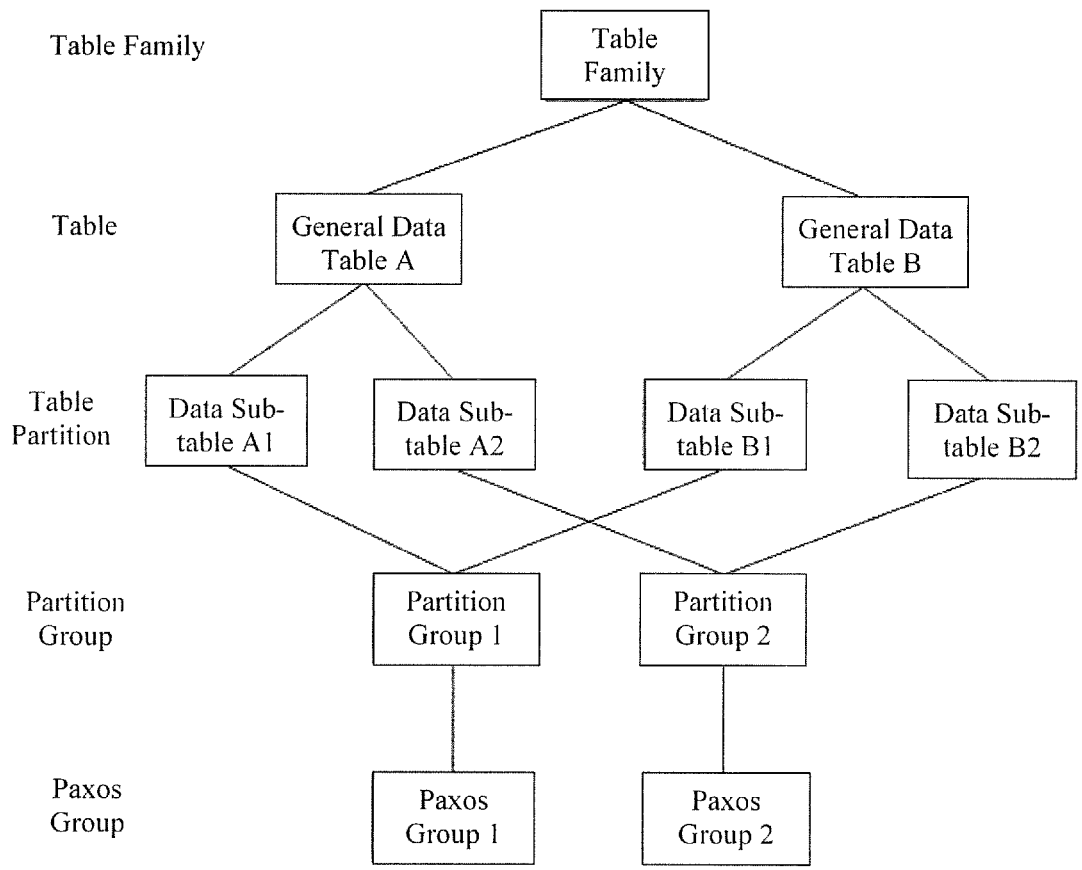
FIGS. 3B-3D are schematic diagrams of a data logical architecture of a distributed database.

Referring to FIG. 3B, a schematic diagram of a data logical architecture of a distributed database is shown. The first layer refers to Table Family, which is used to represent a set of tables in which transactions are associated. The second layer refers to Table for storing data and can also be called a general data table. The third layer refers to Table Partition, which means that a table is partitioned into multiple physical partitions according to a partitioning rule. Each physical partition is a data sub-table of the general data table, and the partition rules of all the tables under the same table family can be the same. The fourth layer refers to Partition Group, which represents the same partition of all the tables under the same table family. The fifth layer refers to Paxos Group, representing a Paxos partition. Data within a Paxos partition can implement local transactions.

As shown in FIG. 3B, since one partition group can only correspond to one Paxos group, data rows of the same partition group can only be written in the same node. In this case, when data needs to be migrated between Paxos groups, the migration can only be done with the table partition group as the minimum unit. As a result, multiple rows of data in a single table partition cannot be written in different nodes. This in turn causes the distributed consensus protocol to be unable to support multi-point writing.

The above process will be described below in conjunction with specific application scenarios. The table family includes a general data table A and a general data table B. An example of the general data table A is as shown in Table 2, and an example of the general data table B is as shown in Table 3. Due to the large amount of content of the general data table A, in order to reduce the space occupied by the general data table A, the general data table A can be partitioned into a data sub-table A1 and a data sub-table A2 according to a partitioning rule 1 (such as last name initial, a number of last name strokes, and so on). Referring to Table 4 and Table 5, two data sub-tables are illustrated as an example, and the number of data sub-tables can be greater than two. Due to the large amount of content of the general data table B, in order to reduce the space occupied by the general data table B, the general data table B can be partitioned into a data sub-table B1 and a data sub-table B2 according to the partitioning rule 1. Referring to Table 6 and Table 7, two data sub-tables are illustrated as an example, and the number of data sub-tables can be greater than two.

TABLE 2

| User name | Identity data |
| --- | --- |
| LI Er | Data A11 |
| LV San | Data A12 |
| ZHANG Er | Data A13 |
| ZHAO San | Data A14 |
| . . . | . . . |

TABLE 3

| User name | Consumption data |
| --- | --- |
| LI Er | Data B11 |
| LV San | Data B12 |
| ZHANG Er | Data B13 |
| ZHAO San | Data B14 |
| . . . | . . . |

TABLE 4

| User name | Identity data |
| --- | --- |
| LI Er | Data A11 |
| LV San | Data A12 |
| . . . | . . . |

TABLE 5

| User name | Identity data |
| --- | --- |
| ZHANG Er | Data A13 |
| ZHAO San | Data A14 |
| ... | ... |

TABLE 6

| User name | Consumption data |
| --- | --- |
| LI Er | Data B11 |
| LV San | Data B12 |
| ... | ... |

TABLE 7

| User name | Consumption data |
| --- | --- |
| ZHANG Er | Data B13 |
| ZHAO San | Data B14 |
| ... | ... |

Further, for the data sub-table A1, the data sub-table A2, the data sub-table B1, and the data sub-table B2, since the initials of the last names of the data sub-table A1 and the data sub-table B1 are L, the data sub-table A1 and the data sub-table B1 are added to the same Partition Group 1, and the Partition Group 1 corresponds to Paxos Group 1. Since the master node of Paxos Group 1 is Node 301, the data sub-table A1 and the data sub-table B1 are stored in Node 301, and the data writing of the data sub-table A1 and the data sub-table B1 is implemented by Node 301.

Since the initials of the last names of the data sub-table A2 and the data sub-table B2 are Z, the data sub-table A2 and the data sub-table B2 are added to the same Partition Group 2, and the Partition Group 2 corresponds to Paxos Group 2. Since the master node of Paxos Group 2 is Node 302, the data sub-table A2 and the data sub-table B2 are stored in Node 302, and the data writing of the data sub-table A2 and the data sub-table B2 is implemented by Node 302.

The reason why the data sub-table A1 and the data sub-table B1 are stored in the same node (e.g., Node 301) is that since the identity data and the consumption data of "LI Er" are stored in the Node 301, if a writing transaction needs to simultaneously write the identity data and the consumption data of "LI Er," it can be performed by Node 301 to improve the writing efficiency. If the identity data of "LI Er" is stored in Node 301 and the consumption data of "LI Er" is stored in Node 302, when a writing transaction needs to simultaneously write the identity data and consumption data of "LI Er," the writing between Node 301 and Node 302 can become complicated, and the writing can even fail.

Apparently, by adding the data sub-table A1 and the data sub-table B1 to the Partition Group 1 and binding Partition Group 1 to Paxos Group 1, the data writing of the data sub-table A1 and the data sub-table B1 can be performed by the Node 301. By adding the data sub-table A2 and the data sub-table B2 to the Partition Group 2 and binding the Partition Group 2 to the Paxos Group 2, the data writing of the data sub-table A2 and the data sub-table B2 can be performed by the Node 302.

However, in the implementation of FIG. 3B, all users in the data sub-table A1 and the data sub-table B1 are to access in the same region, for example, both "LI Er" and "LV San" access in the Region A where the Node 301 is located. Once "LI Er" migrates to Region B, Node 301 cannot write the data of "LI Er."

Figure 3C:
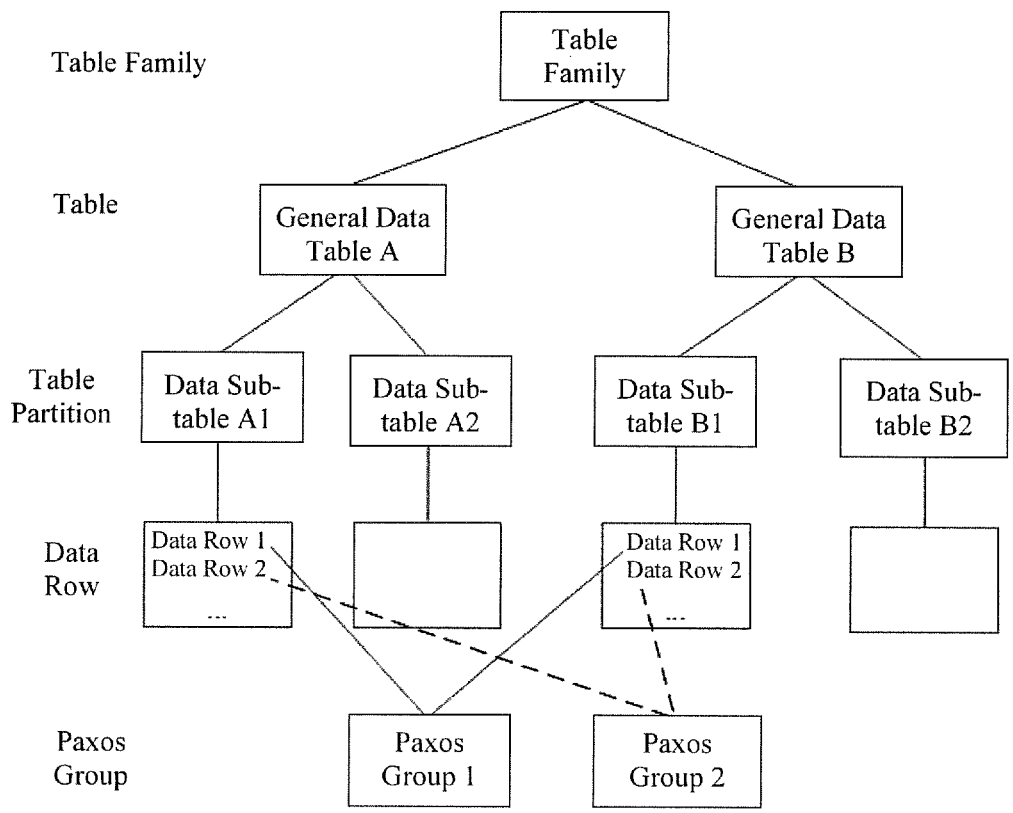
Figure 3D:
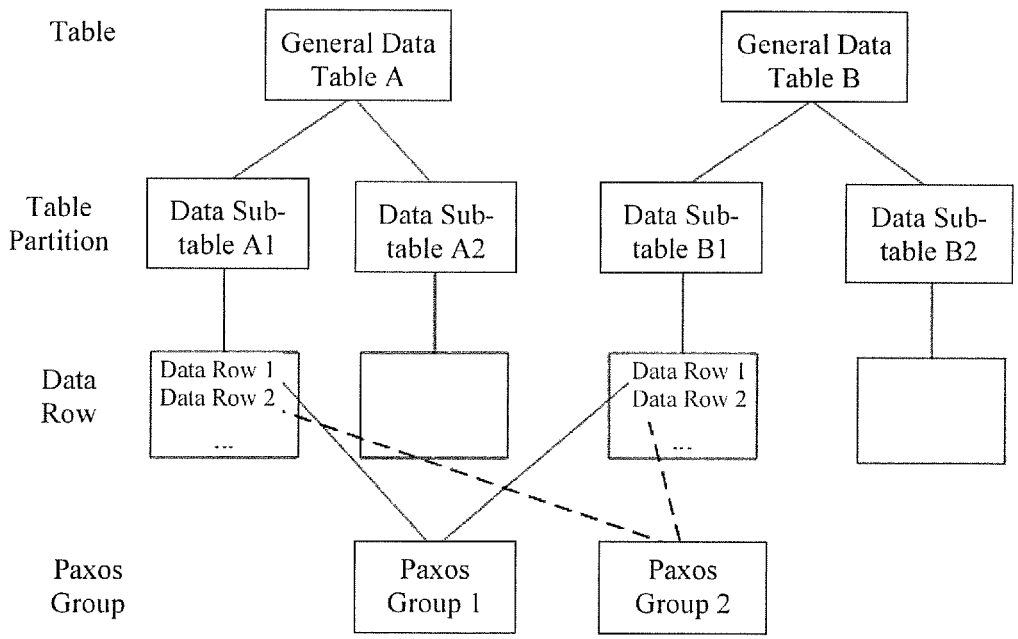

In view of this problem, in some embodiments, data logical architectures of the distributed database are shown in FIG. 3C or FIG. 3D. The table family can be included in FIG. 3C. Therefore, the same partitioning rule (such as the partitioning rule 1) can be used to partition the general data table A into multiple data sub-tables and partition the general data table B into multiple data sub-tables. The table family is not included in FIG. 3D. Therefore, the same partitioning rule or different partition rules can be used to partition the general data table A into multiple data sub-tables and partition the general data table B into multiple data sub-tables. For example, the partitioning rule 1 can be used to partition the general data table A into multiple data sub-tables and partition the general data table B into multiple data sub-tables. Alternatively, the partitioning rule 1 can be used to partition the general data table A into multiple data sub-tables, and a different partitioning rule 2 can be used to partition the general data table B into multiple data sub-tables.

For convenience of description, the general data table A is partitioned into the data sub-table A1 and the data sub-table A2 with the partitioning rule 1, and the general data table B is partitioned into the data sub-table B1 and the data sub-table B2 with the partitioning rule 1. For the general data table A and the general data table B shown in Tables 2 and 3, the data sub-table A1 and the data sub-table A2 are shown in Table 8 and Table 9, and the data sub-table B1 and the data sub-table B2 are shown in Table 10 and Table 11.

TABLE 8

| User name | Group identifier | Identity data |
| --- | --- | --- |
| LI Er | AA | Data A11 |
| LV San | AA | Data A12 |
| ... | ... | ... |

TABLE 9

| User name | Group identifier | Identity data |
| --- | --- | --- |
| ZHANG Er | BB | Data A13 |
| ZHAO San | BB | Data A14 |
| ... | ... | ... |

TABLE 10

| User name | Group identifier | Consumption data |
| --- | --- | --- |
| LI Er | AA | Data B11 |
| LV San | AA | Data B12 |
| ... | ... | ... |

TABLE 11

| User name | Group identifier | Consumption data |
| --- | --- | --- |
| ZHANG Er | BB | Data B13 |
| ZHAO San | BB | Data B14 |
| ... | ... | ... |

Further, for the data sub-table A1, the data sub-table A2, the data sub-table B1, and the data sub-table B2, it is neither necessary to add the data sub-table A1 and the data sub-table B1 to Partition Group 1, nor necessary to add the data sub-table A2 and the data sub-table B2 to Partition Group 2. Therefore, the feature of partition group is not involved, but a group identifier is added for each data row to indicate Paxos Group 1 to which this data row belongs.

For example, a group identifier AA is added to a data row corresponding to "LI Er" in the data sub-table A1 and the data sub-table B1, so that the data row corresponding to "LI Er" corresponds to the Paxos Group 1. Since the master node of Paxos Group 1 is Node 301, the data writing of the data row corresponding to the "LI Er" in the data sub-table A1 and the data sub-table B1 is performed by the Node 301. It is appreciated that since the identity data and the consumption data of "LI Er" are both stored in the Node 301, if a writing transaction needs to simultaneously write the identity data and the consumption data of "LI Er," it can be performed by Node 301 to improve the writing efficiency.

Moreover, in some embodiments, not all users in the data sub-table A1 and the data sub-table B1 need to access in the same region. For example, "LV San" accesses in the Region A where the Node 301 is located, and "LI Er" migrates from the Region A to the Region B. A data row corresponding to "LI Er" in the data sub-table A1 and the data sub-table B1 can be modified from the group identifier AA to the group identifier BB, as shown in Table 12 and Table 13. Thus, the data row corresponding to "LI Er" corresponds to Paxos Group 2. Since the master node of Paxos Group 2 is Node 302, the data writing of the data row corresponding to "LI Er" in the data sub-table A1 and the data sub-table B1 is performed by the Node 302. It is appreciated that since the identity data and the consumption data of "LI Er" are stored in the Node 302, if a writing transaction needs to simultaneously write the identity data and the consumption data of "LI Er," it can be performed by the Node 302 to improve the writing efficiency and realize user migration.

TABLE 12

| User name | Group identifier | Identity data |
|---|---|---|
| LI Er | BB | Data A11 |
| LV San | AA | Data A12 |
| ... | ... | ... |

TABLE 13

| User name | Group identifier | Consumption data |
|---|---|---|
| LI Er | BB | Data B11 |
| LV San | AA | Data B12 |
| ... | ... | ... |

In summary, in some embodiments, by eliminating partition groups and adding the group identifiers of the Paxos groups in data rows, the partition groups and the Paxos groups can be decoupled. The limitation of the partition groups can be broken. Therefore, the limitation that all data in one partition group corresponds to the same Paxos group and can only be written by one node can be avoided. Moreover, the data rows can be directly coupled with the Paxos groups to implement dynamic binding of data rows and Paxos groups.

In some embodiments, the group identifier in a data sub-table can also be referred to as a PGID (Paxos Group ID, or Paxos Group identifier). By adding a group identifier to a data row, the Paxos group to which the data row belongs can be represented by the group identifier, thus realizing the dynamic binding of the data row and the Paxos group. A master node corresponding to the Paxos group of the data row writes the data of the data row. When user migration occurs, the writing node of the data row can be changed by modifying the Paxos group associated with the data row, thus realizing the user migration. Moreover, the minimum data unit is a data row, which realizes traffic-based row-level writing. Distributed transactions of multiple Paxos groups of a single node are implemented by a transaction-level dynamic migration method. It is the basis of near-access of service at the user latitude, a significant change to distributed databases and even associated service architectures. It can solve the problem of data flow switching at the user latitude and support the near-writing of service.

Methods for group identifier based data writing will be described below in conjunction with several specific embodiments.

Embodiment 1

User "LI Er" accesses in Region A, and sends a data write request 1 and a data write request 2. The data write request 1 includes the table name of the data sub-table A1, a user name "ZHANG Er" and Data A15. The data write request 2 includes the table name of the data sub-table B1, the user name "ZHANG Er" and Data B15.

Since the User "LI Er" accesses in the Region A, the Node 301 can receive the data write request 1, and obtain the table name of the data sub-table A1, the user name "ZHANG Er" and the Data A15 from the data write request 1, the Node 301 can determine, according to the table name, that the data table is the data sub-table A1, as shown in Table 8.

Then, with the user name "ZHANG Er" as an index, the data sub-table A1 is searched to obtain a data row (e.g., the first row in Table 8). A group identifier AA included in the data row is the group identifier corresponding to the Data A15.

Then, the mapping table shown in Table 1 is searched with the group identifier AA, to obtain the Node 301 as the master node. Since the master node is the current node (e.g., the Node 301 is the master node of the Paxos Group 1 corresponding to the group identifier AA), the writing process of the Data A15 is performed by the Node 301. Specifically, the Node 301 can modify the Data A11 in the Table 8 to the Data A15, and synchronize the Data A11 in the data sub-table A1 of slave nodes to the Data A15. The data sub-table A1 of the salve nodes is identical to the data sub-table A1 of the master node, and its content is synchronized by the master node. For the Paxos Group 1, the slave nodes are Node 302 and Node 303.

In addition, since the group identifier corresponding to the data write request 1 is the group identifier AA, the transaction group identifier can also be recorded as the group identifier AA, indicating that the current writing transaction is the writing transaction for the group identifier AA.

Since the User "LI Er" accesses in the Region A, the Node 301 can receive the data write request 2. It is assumed that the data write request 2 and the data write request 1 are different writing transactions. Then the processing flow of the data write request 2 is similar to the processing flow of the data write request 1, and details are not described again herein. It is assumed that the data write request 2 is the same writing transaction as the data write request 1. Then the processing of the data write request 2 can be carried out using the processing result of the data write request 1. The processing of the data write request 2 can be carried out based on the transaction group identifier, which will be described below.

First, the Node 301 obtains the table name of the data sub-table B1, the user name "ZHANG Er" and data B15 from the data write request 2. The Node 301 can determine, according to the table name, that the data table is the data sub-table B1, as shown in Table 10. Then, with the user name "ZHANG Er" as an index, the data sub-table B1 is searched to obtain a data row (e.g., the first row in Table 10). A group identifier included in the data row is a group identifier corresponding to the data B15.

Further, depending on the group identifiers, there can be the following cases.

Case 1: Assuming that the group identifier included in the data row is the group identifier AA. Since the group identifier AA is the same as the transaction group identifier (e.g., the group identifier AA), the writing process of the data B15 can be performed by the Node 301. Specifically, the Node 301 can modify the data B11 in Table 10 to the data B15, and synchronize the data B11 in the data sub-table B1 of the slave nodes to the data B15. This data writing process will not be described again.

Case 2: Assuming that the group identifier included in the data row is a group identifier DD. Since the group identifier DD is different from the transaction group identifier (e.g., the group identifier AA), the Node 301 searches the mapping table shown in Table 1 with the group identifier DD and obtains the Node 301 as the master node. Since the master node is the current node (e.g., the Node 301 is the master node of the Paxos Group 4 corresponding to the group identifier DD), the Node 301 can modify the group identifier DD in the data row to the transaction group identifier (e.g., the group identifier AA) and send an update message to slave nodes of the Paxos Group 4. After receiving the update message, the slave nodes of the Paxos Group 4 (e.g., Node 302 and Node 303) modify the group identifier DD of the corresponding data row in the data sub-table B1 to the group identifier AA according to the update message.

After the Node 301 modifies the group identifier DD in the data row to the transaction group identifier (e.g., the group identifier AA), the Paxos group corresponding to the data row is switched from the Paxos Group 4 to the Paxos Group 1. The writing process of the data B15 can be performed by the Node 301. Specifically, the Node 301 can modify the data B11 in Table 10 to the data B15, and synchronize the data B11 in the data sub-table B1 of the slave nodes to the data B15.

Case 3: Assuming that the group identifier included in the data row is a group identifier BB. Since the group identifier BB is different from the transaction group identifier (e.g., the group identifier AA), the Node 301 searches the mapping table shown in Table 1 with the group identifier BB and obtains the Node 302 as the master node. Since the master node is the Node 302 (e.g., the Node 302 is the master node of the Paxos Group 2 corresponding to the group identifier BB), rather than the current node 301, the Node 301 sends a notification message to the Node 302. The notification message can include the transaction group identifier (e.g., the group identifier AA), the index information "ZHANG Er," and the table name of the data sub-table B1. It is appreciated that the content of the notification message is not limited herein.

After receiving the notification message, the Node 302 determines, according to the table name, that the data table is the data sub-table B1, and uses the index information "ZHANG Er" as an index to search the data sub-table B1 to obtain a data row. Then, the Node 302 modifies the group identifier BB included in the data row to the transaction group identifier (e.g., the group identifier AA) in the notification message.

After modifying the group identifier BB in the data row to the group identifier AA, the Node 302 sends an update message to the slave nodes of the Paxos Group 2. After receiving the update message, the slave nodes of the Paxos Group 2 (e.g., Node 301 and Node 303) can modify the group identifier BB of the corresponding data row in the data sub-table B1 to the group identifier AA according to the update message. Specifically, the processing by the Node 301 is described as an example. The update message can include the group identifier AA, the index information "ZHANG Er," and the table name of the data sub-table B1. It is appreciated that the content of the update message is not limited herein. After receiving the update message, the Node 301 determines, according to the table name, that the data table is the data sub-table B1, and uses the index information "ZHANG Er" as an index to query the data sub-table B1 to obtain a data row. Then, the Node 301 modifies the group identifier BB included in the data row to the group identifier AA in the update message.

After the foregoing processing, the group identifier BB in the data row is modified to the transaction group identifier (e.g., the group identifier AA) by the Node 301. The Paxos group corresponding to the data row can be thus switched from the Paxos Group 2 to the Paxos Group 1. Since the master node of the Paxos Group 1 is the Node 301, the writing process of the data B15 can be performed by the Node 301. Specifically, the Node 301 can modify the data B11 in Table 10 to the data B15, and synchronize the data B11 in the data sub-table B1 of the slave nodes to the data B15.

Embodiment 2

User "LI Er" accesses in Region B, and sends a data write request 1 and a data write request 2. The data write request 1 includes the table name of the data sub-table A1, a user name "ZHANG Er" and Data A15. The data write request 2 includes the table name of the data sub-table B1, the user name "ZHANG Er" and Data B15.

Since the User "LI Er" migrates from Region A to Region B and accesses in the Region B, Node 302 receives the data write request 1 and obtains the table name of the data sub-table A1, the user name "ZHANG Er" and the Data A15 from the data write request 1. The Node 302 can determine, according to the table name, that the data table is the data sub-table A1, as shown in Table 8.

Then, with the user name "ZHANG Er" as an index, the data sub-table A1 is searched to obtain a data row (e.g., the first row in Table 8). A group identifier AA included in the data row is the group identifier corresponding to Data A15.

Then, the mapping table shown in Table 1 is searched with the group identifier AA, and Node 301 is obtained as the master node. Since the master node is Node 301 (e.g., Node 301 is the master node of the Paxos Group 1 corresponding to the group identifier AA), rather than the Node 302, Node 302 determines the group identifier (e.g., the group identifier BB) if the master node is Node 302.

Then, the Node 302 sends a notification message to the Node 301. The notification message can include the group identifier BB, the index information "ZHANG Er," and the table name of the data sub-table A1. It is appreciated that the content of the notification message is not limited herein.

Further, after receiving the notification message, the Node 301 determines, according to the table name, that the data table is the data sub-table A1, and uses the index information "ZHANG Er" as an index to search the data sub-table A1 to obtain a data row. The Node 301 modifies the group identifier AA included in the data row to the group identifier BB in the notification message.

After modifying the group identifier AA in the data row to the group identifier BB, the Node 301 sends an update message to the slave nodes of the Paxos Group 1. After receiving the update message, the slave nodes of the Paxos Group 1 (e.g., Node 302 and Node 303) can modify the group identifier AA of the corresponding data row in the data sub-table A1 to the group identifier BB according to the update message. Specifically, the processing by the Node 302 is described as an example. The update message can include the group identifier BB, the index information "ZHANG Er," and the table name of the data sub-table A1. The content of the update message is not limited herein. After receiving the update message, the Node 302 determines, according to the table name, that the data table is the data sub-table A1, and uses the index information "ZHANG Er" as an index to search the data sub-table A1 to obtain a data row. The Node 302 modifies the group identifier AA included in the data row to the group identifier BB in the update message.

After the foregoing processing, the group identifier AA in the data row is modified to the group identifier BB by the Node 302. The Paxos group corresponding to the data row is thus switched from the Paxos Group 1 to the Paxos Group 2 Since the master node of the Paxos Group 2 is the Node 302, the writing process of the Data A15 is performed by the Node 302. Specifically, Node 302 can modify Data A11 in Table 8 to Data A15, and synchronize the Data A11 in the data sub-table A1 of slave nodes (for the Paxos Group 2, the slave nodes are Node 301 and Node 303) to the Data A15.

In addition, since the group identifier corresponding to the data write request 1 is the group identifier BB, the transaction group identifier can also be recorded as the group identifier BB. The transaction group identifier indicates that the current writing transaction is the writing transaction for the group identifier BB.

Since the User "LI Er" accesses in the Region B, the Node 302 can receive the data write request 2. It is assumed that the data write request 2 and the data write request 1 are different writing transactions. Then the processing flow of the data write request 2 is similar to the processing flow of the data write request 1. Details are not described again herein. It is assumed that the data write request 2 is the same writing transaction as the data write request 1. Then the processing of the data write request 2 can be carried out using the processing result of the data write request 1. The processing of the data write request 2 can be carried out based on the transaction group identifier, which will be described below.

First, the Node 302 obtains the table name of the data sub-table B1, the user name "ZHANG Er" and data B15 from the data write request 2. The Node 302 can determine, according to the table name, that the data table is the data sub-table B1, as shown in Table 10. Then, with the user name "ZHANG Er" as an index, the data sub-table B1 is searched to obtain a data row (e.g., the first row in Table 10). A group identifier included in the data row is a group identifier corresponding to the data B15.

Further, depending on the group identifiers, there can be the following cases.

Case 1: Assuming that the group identifier included in the data row is the group identifier BB. Since the group identifier BB is the same as the transaction group identifier (e.g., the group identifier BB), the writing process of the data B15 can be performed by the Node 302. Specifically, the Node 302 can modify the data B11 in the Table 10 to the data B15, and synchronize the data B11 in the data sub-table B1 of the slave nodes to the data B15. This data writing process will not be described again.

Case 2: Assuming that the group identifier included in the data row is a group identifier EE. Since the group identifier EE is different from the transaction group identifier (e.g., the group identifier BB), the Node 302 searches the mapping table shown in Table 1 with the group identifier EE and obtains the Node 302 as the master node. Since the master node is the current node, the Node 302 can modify the group identifier EE in the data row to the transaction group identifier (e.g., the group identifier BB) and send an update message to slave nodes of Paxos Group 5. After receiving the update message, the slave nodes of the Paxos Group 5 modify the group identifier EE of the corresponding data row in the data sub-table B1 to the group identifier BB according to the update message.

After the Node 302 modifies the group identifier EE in the data row to the transaction group identifier (e.g., the group identifier BB), the Paxos group corresponding to the data row is switched from the Paxos Group 5 to the Paxos Group 2. The writing process of the data B15 can be performed by the Node 302. Specifically, the Node 302 can modify the data B11 in the Table 10 to the data B15, and synchronize the data B11 in the data sub-table B1 of the slave nodes to the data B15.

Case 3: Assuming that the group identifier included in the data row is the group identifier AA. Since the group identifier AA is different from the transaction group identifier (e.g., the group identifier BB), the Node 302 searches the mapping table shown in Table 1 with the group identifier AA and obtains the Node 301 as the master node. Since the master node is the Node 301, rather than the current node 302, the Node 302 sends a notification message to the Node 301. The notification message includes the transaction group identifier (e.g., the group identifier BB), the index information "ZHANG Er," and the table name of the data sub-table B1. It is appreciated that the content of the notification message is not limited herein.

After receiving the notification message, the Node 301 determines, according to the table name, that the data table is the data sub-table B1, and uses the index information "ZHANG Er" as an index to search the data sub-table B1 to obtain a data row. Then, the Node 301 modifies the group identifier AA included in the data row to the transaction group identifier (e.g., the group identifier BB) in the notification message.

After modifying the group identifier AA in the data row to the group identifier BB, the Node 301 sends an update message to the slave nodes of the Paxos Group 1. After receiving the update message, the slave nodes of the Paxos Group 1 (e.g., Node 302 and Node 303) can modify the group identifier AA of the corresponding data row in the data sub-table B1 to the group identifier BB according to the update message. After the foregoing processing, the group identifier AA in the data row is modified to the transaction group identifier (e.g., the group identifier BB) by the Node 302. The Paxos group corresponding to the data row is switched from the Paxos Group 1 to the Paxos Group 2.

Since the master node of the Paxos Group 2 is the Node 302, the writing process of the data B15 can be performed by the Node 302. Specifically, the Node 302 can modify the data B11 in the Table 10 to the data B15 and synchronize the data B11 in the data sub-table B1 of the slave nodes to the data B15.

Figure 4:
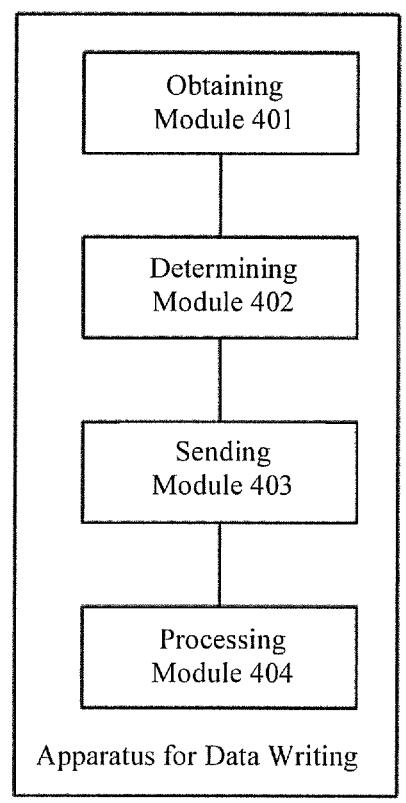
FIG. 4 is a schematic diagram of an apparatus for data writing according to some embodiments of the present disclosure.

In some embodiments of the present disclosure, an apparatus for data writing is further provided. FIG. 4 is a schematic diagram of an exemplary apparatus for data writing The apparatus can include an obtaining module 401, a determining module 402 and a processing module 404. The obtaining module 401 can obtain first to-be-written data. The determining module 402 can determine a first group identifier corresponding to the first to-be-written data, and determine a master node corresponding to the first group identifier. The processing module 404 can write the first to-be-written data if the master node is a current node. In some embodiments, the apparatus can be the current node. In another embodiment, the apparatus can be at the current node.

The determining module 402 can further determine a second group identifier if the master node is a first node other than the current node. A master node corresponding to the second group identifier is the current node. The apparatus can include a sending module 403 which can send the second group identifier to the first node. The first node can modify the first group identifier corresponding to the first to-be-written data to the second group identifier and send an update message to the apparatus. The processing module 404 can receive the update message sent by the first node, modify the first group identifier corresponding to the first to-be-written data to the second group identifier according to the update message, and writes the first to-be-written data.

In an example, when determining a first group identifier corresponding to the first to-be-written data, the determining module 402 specifically determine a first data table corresponding to the first to-be-written data and a first data row in the first data table corresponding to the first to-be-written data. The first data row includes a group identifier corresponding to the first to-be-written data. The determining module 402 can determine the group identifier in the first data row as the first group identifier.

In an example, if the master node corresponding to the first group identifier is the current node, the obtaining module 401 can obtain second to-be-written data. In some embodiments, the index information of the second to-be-written data is the same as the index information of the first to-be-written data. The determining module 402 can determine a group identifier corresponding to the second to-be-written data and further determine a master node corresponding to the group identifier corresponding to the second to-be-written data if the group identifier corresponding to the second to-be-written data is different from the first group identifier. The sending module 403 can, if the master node corresponding to the group identifier corresponding to the second to-be-written data is a second node other than the current node, send the first group identifier to the second node. The second node can receive the first group identifier and modify the group identifier corresponding to the first group identifier or the second to-be-written data to the first group identifier. Then the second node can send an update message to the current node. The processing module 404 can receive the update message sent by the second node, modify the group identifier corresponding to the second to-be-written data to the first group identifier according to the update message, and writes the second to-be-written data.

If the master node corresponding to the first group identifier is a first node other than the current node, the obtaining module 401 can obtain second to-be-written data. In some embodiments, the index information of the second to-be-written data is the same as the index information of the first to-be-written data. The determining module 402 can determine a group identifier corresponding to the second to-be-written data and further determine a master node corresponding to the group identifier corresponding to the second to-be-written data if the group identifier corresponding to the second to-be-written data is different from the second group identifier. The sending module 403 can, if the master node corresponding to the group identifier corresponding to the second to-be-written data is a third node other than the current node, send the second group identifier to the third node. The third node can receive the second group identifier and modify the group identifier corresponding to the second group identifier or the second to-be-written data to the second group identifier. Then, the third node can send an update message to the current node. The processing module 404 can receive the update message sent by the third node, modify the group identifier corresponding to the second to-be-written data to the second group identifier according to the update message, and writes the second to-be-written data.

Figure 5:
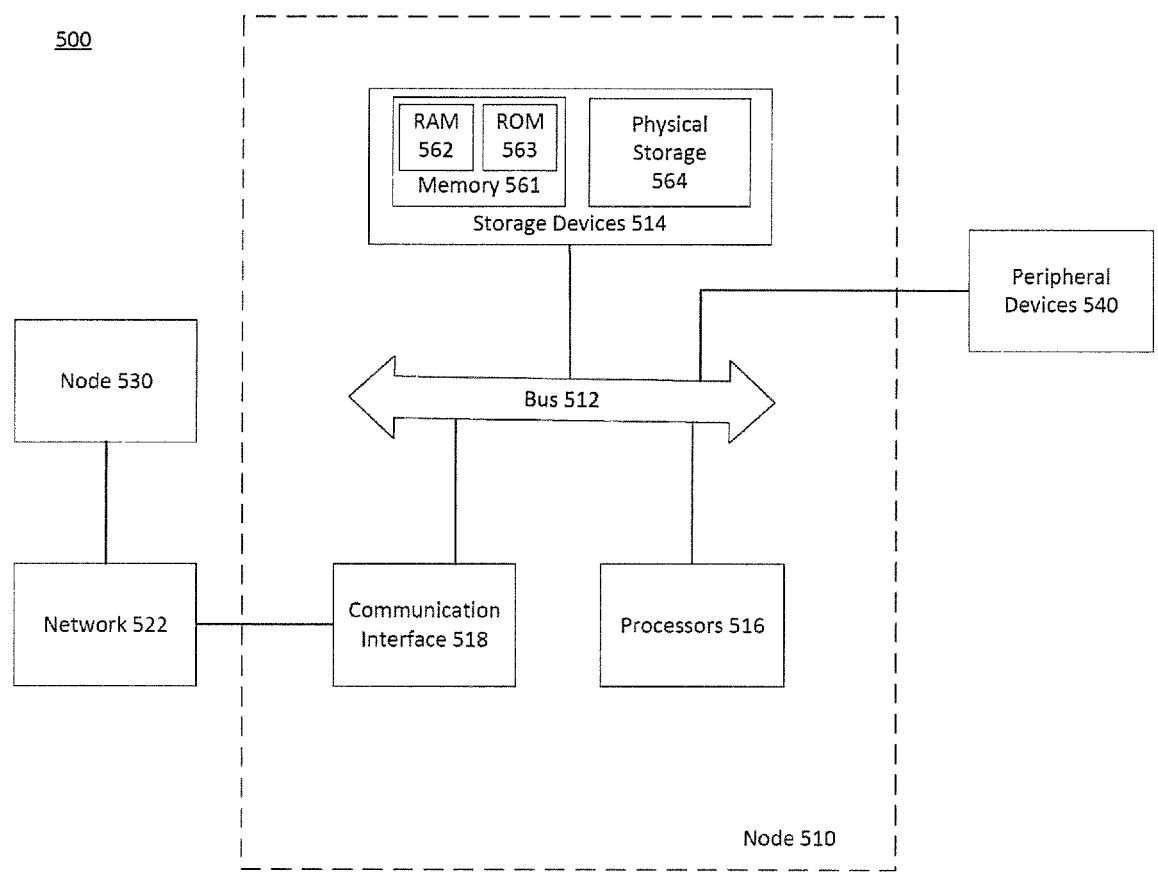
FIG. 5 is a schematic diagram illustrating an exemplary node of a distributed database, according to some embodiments of the present disclosure.

FIG. 5 is a schematic diagram illustrating an exemplary node 510 of a distributed database 500, according to some embodiments of the present disclosure. In some embodiments, a method, apparatus or device for data writing in present disclosure can be implemented by the exemplary node 510 or distributed database 500.

According to FIG. 5, node 510 comprises a bus 512 or other communication mechanism for communicating information, and one or more processors 516 communicatively coupled with bus 512 for processing information. Processors 516 can be, for example, one or more microprocessors.

Node 510 can transmit data to or communicate with another node 530 through a network 522. Network 522 can be a local network, an internet service provider, internet, or any combination thereof. Communication interface 518 of node 510 is connected to network 522. In addition, node 510 can be coupled via bus 512 to peripheral devices 540, which comprises displays (e.g., cathode ray tube (CRT), liquid crystal display (LCD), touch screen, etc.) and input devices (e.g., keyboard, mouse, soft keypad, etc.).

Node 510 can be implemented using customized hardwired logic, one or more ASICs or FPGAs, firmware, or program logic that in combination with the node causes node 510 to be a special-purpose machine.

Node 510 further comprises storage devices 514, which may include memory 561 and physical storage 564 (e.g., hard drive, solid-state drive, etc.). Memory 561 may include random access memory (RAM) 562 and read only memory (ROM) 563. Storage devices 514 can be communicatively coupled with processors 516 via bus 512. Storage devices 514 may include a main memory, which can be used for storing temporary variables or other intermediate information during execution of instructions to be executed by processors 516. Such instructions, after being stored in non-transitory storage media accessible to processors 516, render node 510 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media and/or volatile media. Non-transitory media include, for example, optical or magnetic disks, dynamic memory, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 516 for execution. For example, the instructions can initially be carried out on a magnetic disk or solid-state drive of a remote computer. The remote computer can load the instructions into its dynamic memory and send the instructions over a telephone line using a modem. A modem local to node 510 can receive the data on the telephone line and use an infra-red transmitter to convert the data to an infra-red signal. An infra-red detector can receive the data carried in the infra-red signal and appropriate circuitry can place the data on bus 512. Bus 512 carries the data to the main memory within storage devices 514, from which processors 516 retrieves and executes the instructions.

In some embodiments of the present disclosure, a device for data writing is provided. In some embodiments, the device can be a node in a distributed database (e.g., current node). In another embodiment, the device can be included in a node in a distributed database (e.g., current node). The device includes: a processor and a non-transitory machine-readable storage medium. The non-transitory machine-readable storage medium stores a plurality of instructions. When executed by the processor, the instructions cause the device to perform any method in embodiments of present disclosure. For example, when executed by the processor, the instructions cause the device to perform a method including: obtaining first to-be-written data; determining a first group identifier corresponding to the first to-be-written data and a master node corresponding to the first group identifier; and writing the first to-be-written data if the master node is a current node. The method can also include: determining a second group identifier if the master node is a first node other than the current node, a master node corresponding to the second group identifier being the current node; sending the second group identifier to the first node; receiving an update message sent by the first node, the update message indicating that at the first node, the first group identifier corresponding to the first to-be-written data is modified to the second group identifier; modifying the first group identifier corresponding to the first to-be-written data to the second group identifier according to the update message; and writing the first to-be-written data.

In some embodiments of the present disclosure, a non-transitory machine-readable storage medium is further provided. The non-transitory machine-readable storage medium stores a plurality of instructions. When executed by a processor, the instructions cause a machine to perform any method in embodiments of present disclosure. For example, when executed by the processor, the instructions cause the machine to perform a method including: obtaining first to-be-written data; determining a first group identifier corresponding to the first to-be-written data and a master node corresponding to the first group identifier; and writing the first to-be-written data if the master node is a current node. The method can also include: determining a second group identifier if the master node is a first node other than the current node, a master node corresponding to the second group identifier being the current node; sending the second group identifier to the first node; receiving an update message sent by the first node, the update message indicating that at the first node, the first group identifier corresponding to the first to-be-written data is modified to the second group identifier; modifying the first group identifier corresponding to the first to-be-written data to the second group identifier according to the update message; and writing the first to-be-written data.

In some embodiments of the present disclosure, an apparatus for data writing is provided. In some embodiments, the apparatus can be a node in a distributed database. In another embodiment, the apparatus can be included in a node in a distributed database. The node corresponds to at least one group, and is a master node of a group. The apparatus can include an obtaining module to obtain first to-be-written data, a determining module to determine a first data row corresponding to the first to-be-written data and a processing module. The first data row includes a group identifier corresponding to the first to-be-written data. The processing module can modify the group identifier included in the first data row to a group identifier of a group corresponding to the node, to dynamically bind the first data row to the group corresponding to the node.

The systems, apparatuses, devices, modules or units illustrated in the embodiments can specifically be implemented by a computer chip or an entity, or by a product having a certain function. A typical implementing device is a computer, and the computer can be in a specific form of a personal computer, a laptop computer, a cellular phone, a camera phone, a smart phone, a personal digital assistant, a media player, a navigation device, an email transceiver device, a game console, a tablet computer, a wearable device or any combination of these devices.

For the convenience of description, the above-described devices and apparatuses are described separately as various units partitioned by function. Of course, the functions of the various units can be implemented in the same or multiple pieces of software and/or hardware in the implementation of the present disclosure.

Those skilled in the art should understand that the embodiments of the present disclosure can be provided as a method, a system, or a computer program product. Accordingly, the present disclosure can take the form of an entirely hardware embodiment, an entirely software embodiment, or some embodiments combining software and hardware. Moreover, the embodiments of the present disclosure can take the form of a computer program product implemented on one or more computer usable storage media (including, but not limited to, disk memories, CD-ROMs, optical memories, etc.) comprising computer usable program codes.

The present disclosure is described with reference to the flowcharts and/or the block diagrams of a method, a device (system), and a computer program product according to the embodiments of the present disclosure. It should be understood that each process and/or block in the flowcharts and/or block diagrams, as well as combinations of the processes and/or blocks in the flowcharts and/or the block diagrams, can be implemented by computer program instructions. These computer program instructions can be provided to a processor of a computer, an embedded processor, or other programmable data processing devices to produce a machine such that an apparatus for implementing the functions specified in one or more processes in the flowcharts and/or one or more blocks in the block diagrams can be produced by instructions executed by the processor of the computer or other programmable data processing devices.

These computer program instructions can also be stored in a computer readable memory that can direct a computer or other programmable data processing devices to function in a particular manner such that the instructions stored in the computer readable memory produce an article of manufacture including an instruction means which implements functions specified in one or more processes in the flowcharts and/or one or more blocks in the block diagrams.

These computer program instructions can also be loaded onto a computer or other programmable data processing devices so that a series of operating steps are performed on the computer or other programmable devices to produce computer-implemented processing. Thus the instructions executed on a computer or other programmable devices provide steps for implementing the functions specified in one or more processes in the flowcharts and/or one or more blocks in the block diagrams.

The above descriptions are only embodiments of the present disclosure and are not intended to limit the present disclosure. For those skilled in the art, various modifications and changes can be made to the present disclosure. Any modifications, equivalent substitutions, improvements, etc. made within the spirit and principle of the present disclosure are intended to be included within the scope of the appended claims of the present disclosure.

What is claimed is:

1. A method for data writing implemented by a current node of a distributed database system, comprising:
   obtaining first to-be-written data;
   determining a first group identifier corresponding to the first to-be-written data;
   determining a first master node corresponding to the first group identifier;
   in response to the first master node being a first node of the distributed database system other than a current node,
      determining a second group identifier, a second master node corresponding to the second group identifier being the current node,
      sending the second group identifier to the first node,
      receiving a first update message from the first node, the first update message indicating that at the first node, the first group identifier is modified to the second group identifier, and
      modifying the first group identifier to the second group identifier; and
   writing the first to-be-written data.

2. The method according to claim 1, wherein determining the first group identifier corresponding to the first to-be-written data comprises:
   determining a first data row in a first data table corresponding to the first to-be-written data; and
   determining a group identifier in the first data row as the first group identifier.

3. The method according to claim 1, wherein determining the first master node corresponding to the first group identifier comprises:
   retrieving the first master node from a mapping table,
   wherein the mapping table comprises a plurality of group identifiers and corresponding master nodes.

4. The method according to claim 1, wherein determining the second group identifier comprises:
   retrieving the second group identifier from a mapping table,
   wherein the mapping table comprises a plurality of group identifiers and corresponding master nodes.

5. The method according to claim 1, wherein sending the second group identifier to the first node comprises:
   sending to the first node a notification message which comprises the second group identifier and index information of the first to-be-written data.

6. The method according to claim 1, wherein modifying the first group identifier to the second group identifier comprises:
   determining a first data row in a first data table corresponding to the first to-be-written data according to an index information in the update message.

7. The method according to claim 1, further comprises:
   if the first master node is the current node,
   obtaining a second to-be-written data;
   determining a third group identifier corresponding to the second to-be-written data;
   determining a third master node corresponding to the third group identifier if the third group identifier is different from the first group identifier;
   sending the first group identifier to a second node of the distributed database system other than the current node if the third master node is the second node; and
   receiving a second update message from the second node, the second update message indicating that at the second node, the third group identifier is modified to the first group identifier;
   modifying the third group identifier to the first group identifier; and
   writing the second to-be-written data.

8. The method according to claim 7, further comprising:
   modifying the third group identifier to the first group identifier if the third master node is the current node;
   writing the second to-be-written data; and
   sending a third update message indicating the modification of the third group identifier to the first group identifier.

9. The method according to claim 7, further comprising:
   writing the second to-be-written data if the third group identifier is the same as the first group identifier.

10. The method according to claim 1, further comprising:
   if the first master node is the first node other than the current node,
   obtaining a second to-be-written data;
   determining a third group identifier corresponding to the second to-be-written data;
   determining a third master node corresponding to the third group identifier if the third group identifier is different from the second group identifier;
   sending the second group identifier to a second node of the distributed database system other than the current node if the third master node is the second node; and
   receiving a third update message from the second node, the third update message indicating that at the second node, the third group identifier is modified to the second group identifier;
   modifying the third group identifier to the second group identifier; and
   writing the second to-be-written data.

11. The method according to claim 10, further comprising:
   modifying the third group identifier to the second group identifier if the third master node is the current node;
   writing the third to-be-written data; and
   sending a third update message indicating the modification of the third group identifier to the second group identifier.

12. The method according to claim 10, further comprising:

writing the second to-be-written data if the third group identifier is the same as the second group identifier.

13. The method according to claim 1, wherein the current node and the first node are located in different regions.

14. An apparatus for data writing at a current node of a distributed database system, comprising:
a memory storing a set of instructions; and
one or more processors configured to execute the set of instructions to cause the apparatus to perform:
obtaining first to-be-written data;
determining a first group identifier corresponding to the first to-be-written data;
determining a first master node corresponding to the first group identifier;
in response to the first master node being a first node of the distributed database system other than a current node,
determining a second group identifier, a second master node corresponding to the second group identifier being the current node,
sending the second group identifier to the first node,
receiving a first update message from the first node, the first update message indicating that at the first node, the first group identifier is modified to the second group identifier, and
modifying the first group identifier to the second group identifier; and
writing the first to-be-written data.

15. The apparatus according to claim 14, wherein determining the first group identifier corresponding to the first to-be-written data comprises:
determining a first data row in a first data table corresponding to the first to-be-written data; and
determining a group identifier in the first data row as the first group identifier.

16. A non-transitory machine-readable storage medium storing a set of instructions that are executable by one or more processors of a current node of a distributed database system to cause the current node to perform a method comprising:
obtaining first to-be-written data;
determining a first group identifier corresponding to the first to-be-written data;
determining a first master node corresponding to the first group identifier;
in response to the first master node being a first node of the distributed database system other than a current node,
determining a second group identifier, a second master node corresponding to the second group identifier being the current node,
sending the second group identifier to the first node,
receiving a first update message from the first node, the first update message indicating that at the first node, the first group identifier is modified to the second group identifier, and
modifying the first group identifier to the second group identifier; and
writing the first to-be-written data.

17. The non-transitory machine-readable storage medium according to claim 16, wherein determining the first group identifier corresponding to the first to-be-written data comprises:
determining a first data row in a first data table corresponding to the first to-be-written data; and
determining a group identifier in the first data row as the first group identifier.

* * * * *